US012442230B2

(12) United States Patent
Conkling et al.

(10) Patent No.: US 12,442,230 B2
(45) Date of Patent: Oct. 14, 2025

(54) DOOR STOP MECHANISM

(71) Applicant: Textron Aviation Inc., Wichita, KS (US)

(72) Inventors: Richard Stoddard Conkling, Kechi, KS (US); Mark Corbett Haley, Bel Aire, KS (US)

(73) Assignee: Textron Innovations Inc., Providence, RI (US)

( * ) Notice: Subject to any disclaimer, the term of this patent is extended or adjusted under 35 U.S.C. 154(b) by 238 days.

(21) Appl. No.: 18/053,745

(22) Filed: Nov. 8, 2022

(65) Prior Publication Data

US 2023/0142995 A1 May 11, 2023

Related U.S. Application Data

(60) Provisional application No. 63/277,243, filed on Nov. 9, 2021.

(51) Int. Cl.
*E05C 17/32* (2006.01)
*E05C 17/08* (2006.01)
*E05C 17/30* (2006.01)

(52) U.S. Cl.
CPC .............. *E05C 17/32* (2013.01); *E05C 17/08* (2013.01); *E05C 17/30* (2013.01)

(58) Field of Classification Search
CPC ........... E05C 17/32; E05C 17/08; E05C 17/30
See application file for complete search history.

(56) References Cited

U.S. PATENT DOCUMENTS

| | | | | |
|---|---|---|---|---|
| 4,069,547 A | 1/1978 | Guionie et al. | | |
| 4,497,462 A * | 2/1985 | Hamatani | B64C 1/1415 | 244/129.5 |
| 5,156,359 A * | 10/1992 | Noble | E05B 5/003 | 292/DIG. 31 |
| 5,180,121 A * | 1/1993 | Banks | E05F 15/72 | 49/237 |
| 5,305,969 A * | 4/1994 | Odell | B64C 1/1407 | 292/259 R |
| 6,292,978 B1 | 9/2001 | Lakoduk et al. | | |
| 6,378,806 B1 * | 4/2002 | Erben | B64C 1/1407 | 244/129.4 |
| 10,954,704 B2 | 3/2021 | Kroening | | |
| 11,661,166 B2 * | 5/2023 | Mortland | B64C 1/1423 | 244/129.5 |
| 2003/0141415 A1 * | 7/2003 | Leclerc | B64C 1/32 | 244/129.5 |

(Continued)

*Primary Examiner* — Mark A Williams
(74) *Attorney, Agent, or Firm* — Avek IP, LLC

(57) ABSTRACT

A door stop includes a scissor link member including a pair of links pivotably coupled together at a central pivot point. The scissor link member has a first end pivotally coupled to a door and a second end pivotally coupled to a floor. The pair of links are configured to abut against one another adjacent the central pivot point when the door is fully open to prevent pivoting at the central pivot point for holding the door open. The scissor link member is releasable such that the pair of links pivot about the central pivot point when the scissor link member is released, thereby enabling closing of the door. The pair of links fold into a nested arrangement when the door is fully closed. The pair of links are configured to deform under dynamic loads to protect the surrounding aircraft structure and indicate a need for inspection.

13 Claims, 9 Drawing Sheets

(56) References Cited

U.S. PATENT DOCUMENTS

| | | | | |
|---|---|---|---|---|
| 2015/0337570 | A1* | 11/2015 | Powell | E05B 63/14<br>292/336.3 |
| 2018/0319479 | A1* | 11/2018 | Bessettes | E05C 3/162 |
| 2020/0018096 | A1* | 1/2020 | Dyer | B64C 1/1461 |
| 2022/0136290 | A1* | 5/2022 | Tendyra | E05B 83/02<br>49/394 |
| 2022/0145685 | A1* | 5/2022 | Mortland | E05F 5/025 |
| 2022/0412132 | A1* | 12/2022 | Dubosc | B64C 1/143 |

* cited by examiner

DOOR STOP MECHANISM

CROSS-REFERENCE TO RELATED APPLICATIONS

This application claims the benefit of priority of U.S. Provisional Patent Application No. 63/277,243, entitled Door Stop Mechanism and filed on Nov. 9, 2021, the disclosure of which is herein incorporated by reference in its entirety.

BACKGROUND OF THE INVENTION

1. Field

The disclosed embodiments relate generally to the field of door mechanisms. More specifically, the embodiments relate to a door stop mechanisms for aircraft doors.

2. Description of the Related Art

U.S. Pat. No. 4,069,547 to Guionie et al. describes a toggle-type door stop having a pair of links pivotably coupled to one another that form a cam when moved to an open position. U.S. Pat. No. 10,954,704 to Kroening describes a door stop mechanism having a link member with an elongated slot and a fastener that slides along the slot to hold the door open. U.S. Pat. No. 6,292,978 to Lakoduk et al. describes a door stop apparatus having a guide member and a link pivotally connected to a follower. As the door opens and closes, the link pivots and the follower slides within the guide member.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a door stop mechanism for an aircraft includes an outer link including a first end and a second end, the outer link rotatably coupled to a door of the aircraft at the second end; and, an inner link including a first end and a second end, the inner link being rotatably coupled to a floor of the aircraft at the second end. The first end of the inner link is rotatably coupled to the first end of the outer link, and the first end of the inner link is configured to abut against the first end of the outer link to provide a hold-open position in which the door is held open.

In another embodiment, a door stop includes a scissor link member including a pair of links pivotably coupled together at a central pivot point. The scissor link member has a first end pivotally coupled to a door and a second end pivotally coupled to a floor. The pair of links are configured to abut against one another adjacent the central pivot point when the door is fully open such that the pair of links prevent pivoting at the central pivot point for holding the door open in a hold-open position. The scissor link member is releasable from the hold-open position such that the pair of links pivot about the central pivot point when the scissor link member is released from the hold-open position, thereby enabling closing of the door. The pair of links fold into a nested arrangement when the door is fully closed.

In yet another embodiment, an aircraft door stop includes a first link pivotably coupled to a door about a first pivot point; a second link pivotably coupled to a floor about a second pivot point; and a third pivot point. The first link and the second link are jointly coupled together about the third pivot point. The first link nests within the second link to form a nested arrangement when the door is closed. The first pivot point, the second pivot point, and the third pivot point are aligned with one another to form an aligned arrangement when the door is fully open.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1B:
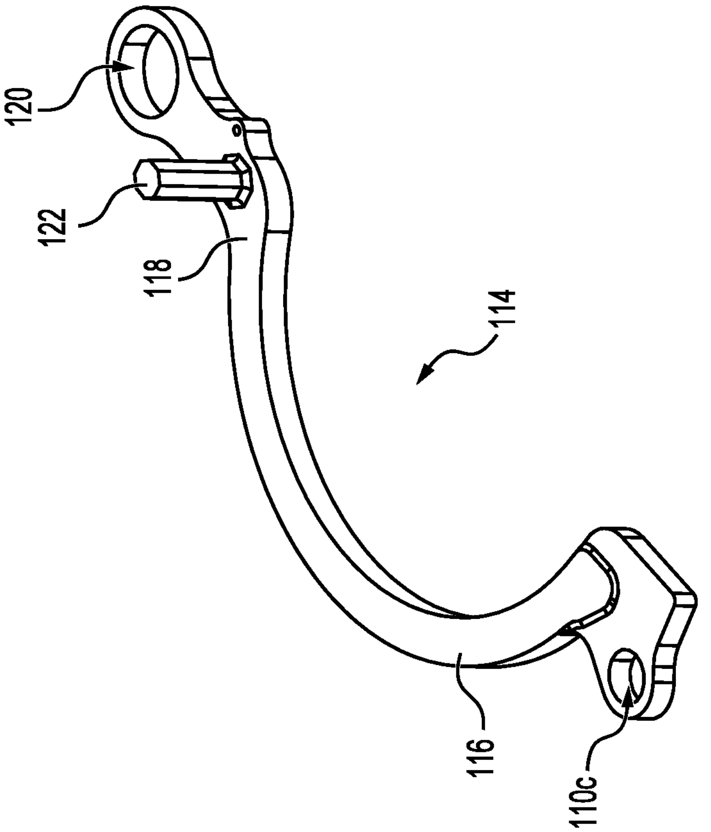
FIG. 1B illustrates an inner scissor link for the door stop mechanism for some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Many different types of door stop mechanisms are known. Forward-hinged doors typically rely upon hinge mechanisms integrated into a side post structure, which requires a heavier load path for rotating the hinge mechanism. Door stop mechanisms may lack a hold-open feature to hold the door in an open position. Door stop mechanisms which have a hold-open feature may have the feature disposed in a spot inconvenient for someone sitting, such as a pilot, to actuate. Conventional door stop mechanisms may be too large to work in tight spaces. Further, many door stop mechanisms do not have a built-in feature for indicating a failure in the hinge mechanism.

Embodiments are generally directed to a door stop mechanism for use in aircraft. The door stop mechanism may be configured for forward-hinged doors and may be used to prop a door ajar in, for example, the cockpit of the aircraft. The door stop mechanism may provide improved use of limited door opening space for crew entering and exiting the aircraft. If a large force, such as a gust of wind, is applied to the door that forces the door open, the door stop mechanism may be configured to stretch and deform to aid in minimizing resulting damage to the surrounding aircraft structure. The door stop mechanism includes links that are shaped and formed of a material selected for the ability to mitigate damage to the surrounding structure, and deformation of the links due to excessive force is configured to provide a permanent set in the links to indicate a need for inspection of the surrounding structure and replacement of the links.

The door stop mechanism may be disposed externally to a side post structure of the aircraft, thereby allowing a lighter load path for the door stop mechanism by allowing a more effective moment arm than if the door stop mechanism was integrated into the side post structure. The door stop mechanism may comprise an inner and an outer scissor link connected to one another. The outer scissor link may be connected at a first end to the inner scissor link and at a second end to the aircraft door. The inner scissor link may be connected to the outer scissor link at a first end and to the floor at a second end. When the door is closed, the inner scissor link may nest within the arc of the outer scissor link. As the door is opened, the outer scissor link may rotate about the inner scissor link. If the door is forced open beyond the limitations of the door hinge mechanism, the outer and inner scissor links may become permanently set thereby visually indicating to crew members that the door hinge mechanism needs replacing, and that the surrounding aircraft structure should be inspected for damage.

Figure 1A:
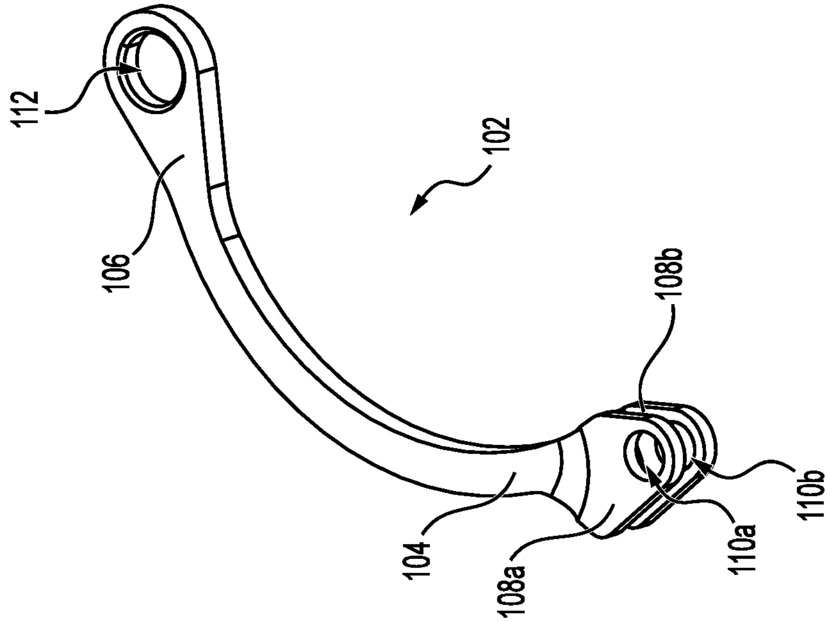
FIG. 1A illustrates an outer scissor link for a door stop mechanism for some embodiments.

FIG. 1A illustrates an outer link 102 for some embodiments. Outer link 102 may comprise a first end 104 and a second end 106. In some embodiments, first end 104 is formed as a mounting bracket comprising an upper arm 108*a* and a lower arm 108*b*. Arms 108*a*, 108*b* may comprise first openings 110*a*, 110*b* therethrough. First openings 110*a*, 110*b* form a pair of openings that are aligned with one another. In some embodiments, second end 106 comprises a second opening 112 therethrough. Outer link 102 may comprise a height of about 4 mm to about 20 mm. Second opening 112 may comprise a diameter of about 13 mm to about 17 mm. Broadly, outer link 102 may take various sizes depending on the specific application and forces applied to the door. Outer link 102 may have a substantially curved shape along its longitudinal axis. Outer link 102 may comprise aluminum, steel, titanium, copper, brass, and other like metals including metal alloys.

Figure 2A:
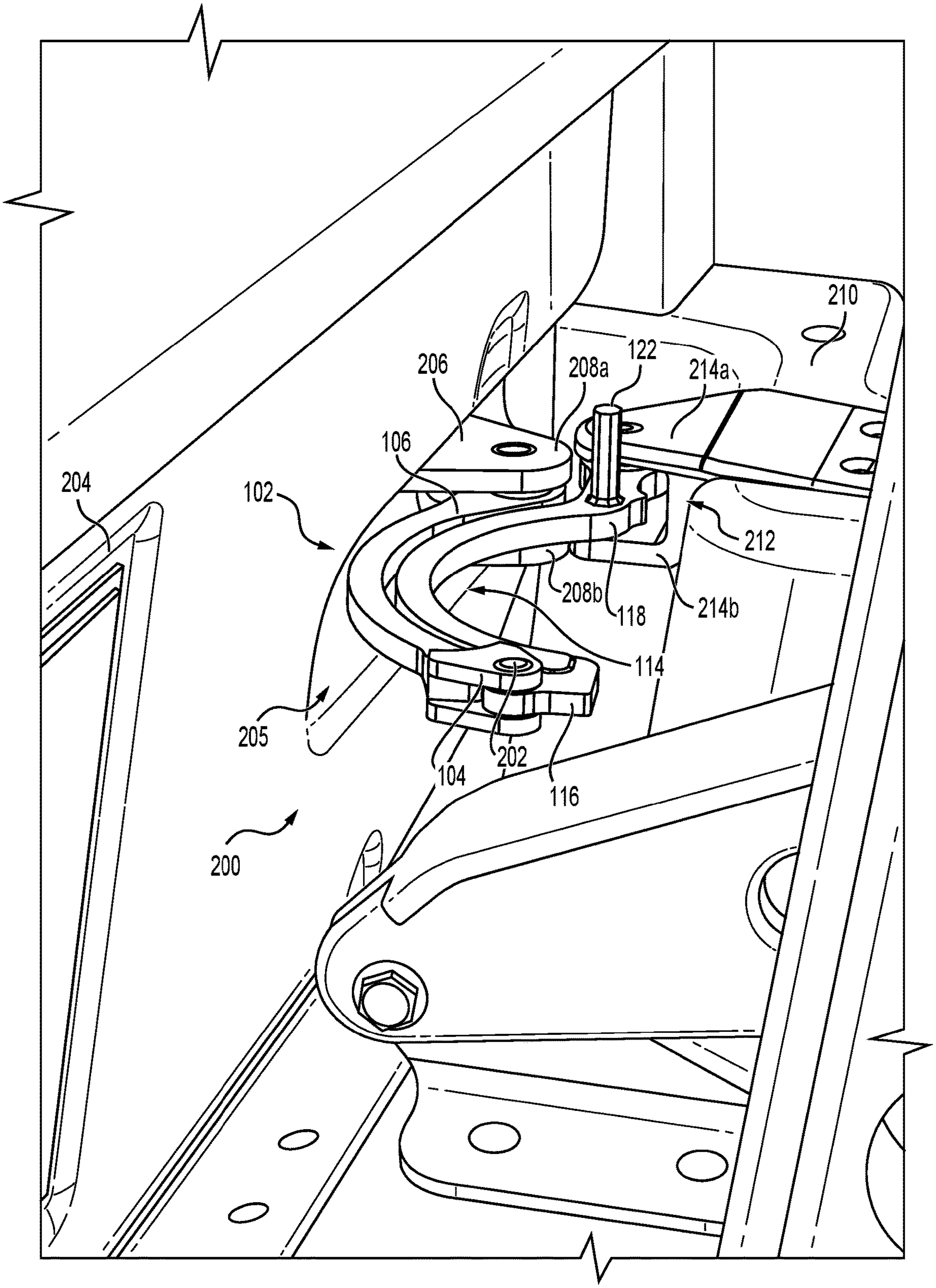
FIG. 2A illustrates the door stop mechanism in a closed position for some embodiments.

FIG. 1B illustrates an inner link 114 for some embodiments. Inner link 114 may comprise a first end 116 and a second end 118. First end 116 may correspond to first end 104 of outer link 102. First end 116 may comprise a first opening 110*c* therethrough. First openings 110*a*, 110*b*, 110*c* may comprise a diameter of about 6 mm to about 10 mm. In some embodiments, inner link 114 is configured to nest within the arc of outer link 102, as illustrated in FIG. 2A below. A link connector 202 may be inserted through first openings 110*a*, 110*b*, 110*c* to secure outer link 102 to inner link 114, as described below in connection with FIG. 2A.

Second end 118 may comprise a second opening 120 therethrough. Inner link 114 may also comprise a release member 122 protruding upwardly from a top side of inner link 114 at second end 118, as depicted in FIG. 1B. As discussed further below with respect to FIGS. 3A and 3B, links 102, 114 may be configured to hold the aircraft door in an open position by pivoting about first openings 110*a*, 110*b*, 110*c* to a hold-open position in which first ends 104, 116 abut against each other to hold the door open. Release member 122 allows aircraft crew members to easily release the links 102, 114 from the hold-open position allowing the aircraft door to close and moving links 102, 114 towards the closed position shown in FIG. 2A. In some embodiments, release member 122 comprises a post having a substantially rectangular, cylindrical, pentagonal, hexagonal, octagonal, or other like shape. Release member 122 may comprise a height of about 20 mm to about 24 mm. Release member 122 may comprise a thickness or diameter of about 5 mm to about 9 mm. Release member 122 is discussed in further detail below with respect to FIGS. 3A and 3B. Upon actuation, release member 122 is displaced thereby moving inner link 114 and dislodging links 102, 114 from abutting one another.

Inner link 114 may have a substantially curved shape along its longitudinal axis. Inner link 114 may comprise aluminum, steel, brass, titanium, copper, and other like metals. Inner link 114 may comprise a height (not including release member 122) of about 4 mm to about 8 mm. Second opening 120 may comprise a diameter of about 14 mm to about 18 mm. Broadly, inner link 114 may take various sizes depending on the specific application and forces applied to the door.

FIG. 2A illustrates door stop mechanism 200 comprising outer link 102 and inner link 114 in a closed position for some embodiments. In the closed position, inner link 114 may nest within the arc of outer link 102. Specifically, inner link 114 and outer link 102 each have a similar curvature such that the two links are substantially aligned with one another when folded together into a nested arrangement.

Outer link 102 and inner link 114 may be connected together at first ends 104, 116 via link connector 202. To connect outer link 102 to inner link 114, first end 116 of inner link 114 may be inserted between arms 108*a*, 108*b* on first end 104 of outer link 102. Link connector 202 may be inserted through first openings 110*a*, 110*b*, 110*c* disposed on first ends 104, 116 such that links 102, 114 are jointly coupled together about a central pivot point. As discussed further below with respect to FIG. 3A, link connector 202 may comprise a clevis pin for securing outer link 102 to inner link 114. Inner link 114 and outer link 102 together form a scissor link member having a pair of links pivotably coupled together at the central pivot point via link connector 202 such that the pair of links provide scissor-like movement between open and closed positions.

Outer link 102 may be pivotably coupled to door 204 via door bracket 206. Door bracket 206 may be substantially similar to a mounting bracket with an upper arm 208*a* and a lower arm 208*b*. Second end 106 of outer link 102 may be inserted between upper arm 208*a* and lower arm 208*b*. A door bracket connector 402 (see FIG. 4A) may be inserted through door bracket 206 and outer link 102 (via second opening 112) to secure outer link 102 to door bracket 206. Outer link 102 is configured for pivoting about door bracket connector 402 when transitioning between open and closed positions. Outer link 102 may be nested within a groove 205 of door 204 when closed. In some embodiments, door bracket 206 is fixed to door 204. Groove 205 may comprise any indentation or opening within door 204 configured to receive a portion of outer link 102.

Inner link 114 may be coupled to floor 210 via floor bracket 212. Floor bracket 212 may be substantially similar to a mounting bracket with an upper arm 214*a* and a lower arm 214*b*. Floor bracket 212 may be coupled to floor 210 adjacent a top corner of a step 216 such that upper arm 214*a* is substantially flush with floor 210 (see FIG. 2D). Lower arm 214*b* may be located along the side of the step 216 which may form a step-down area for exiting the aircraft. Second end 118 of inner link 114 may be inserted between upper arm 214*a* and lower arm 214*b*. A floor bracket connector 406 (see FIG. 4B) may be inserted through floor bracket 212 and inner link 114 (via second opening 120) to pivotably secure inner link 114 to floor 210. Inner link 114 is configured for pivoting about floor bracket connector 406 when transitioning between open and closed positions.

Figure 2B:
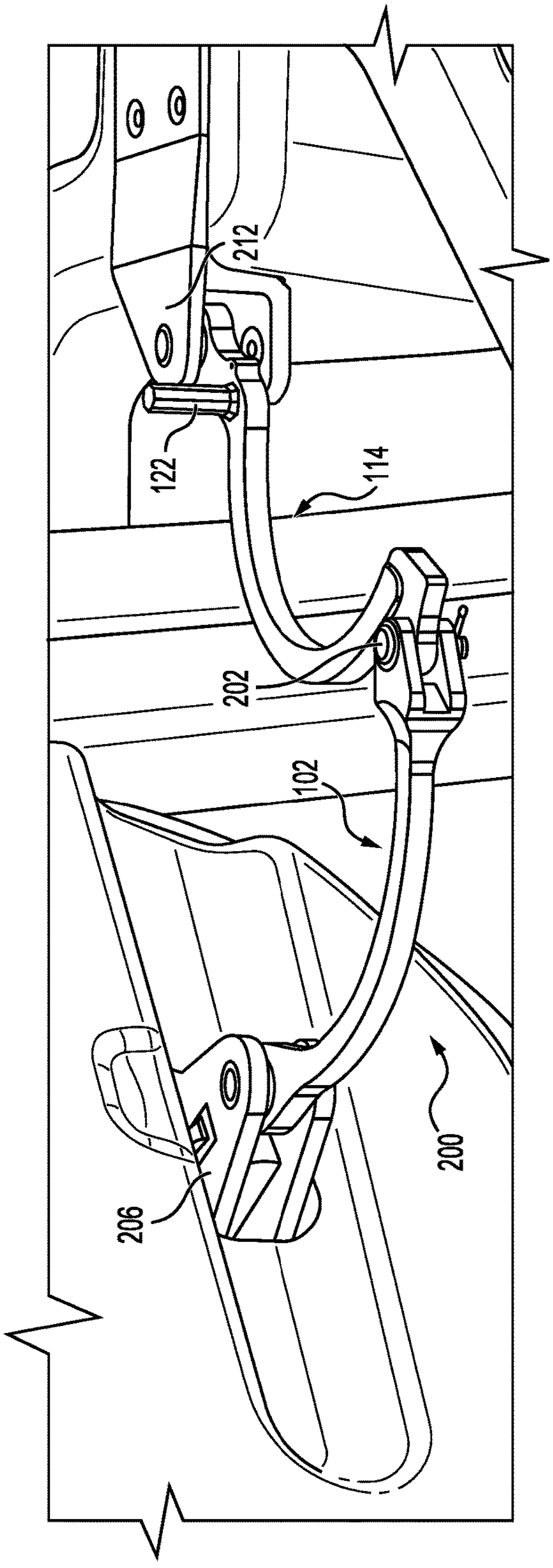
FIG. 2B illustrates the door stop mechanism in a first intermediate position for some embodiments.
Figure 2C:
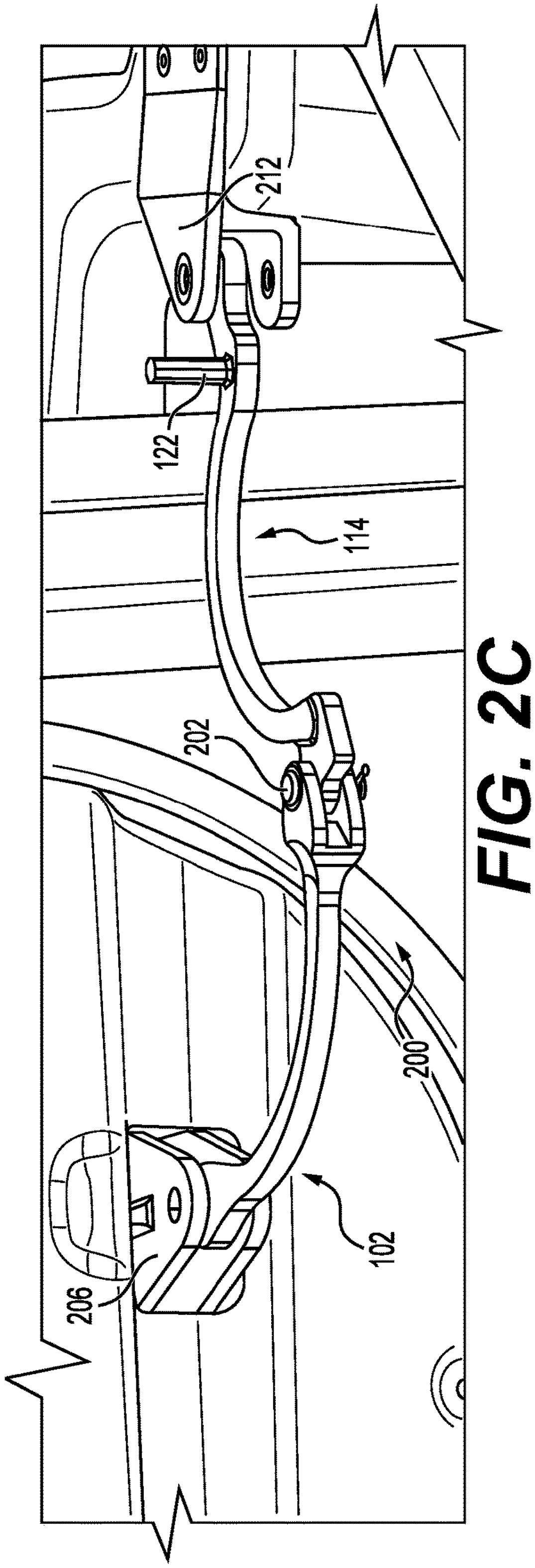
FIG. 2C illustrates the door stop mechanism in a second intermediate position for some embodiments.

FIG. 2B illustrates door stop mechanism 200 in a first intermediate position for some embodiments, and FIG. 2C illustrate door stop mechanism 200 in second intermediate position for some embodiments. The first intermediate position illustrates the position of door stop mechanism 200 in an early stage of opening door 204, and the second intermediate position illustrates the position of door stop mechanism 200 in a later stage of opening door 204. As illustrated in FIGS. 2B and 2C, as door 204 opens, door stop mechanism 200 may rotate and move into a fully-opened position (see FIG. 3A) whereby openings 110*a*, 110*b*, 110*c*, 112, and 120 are substantially in-line.

Figure 2D:
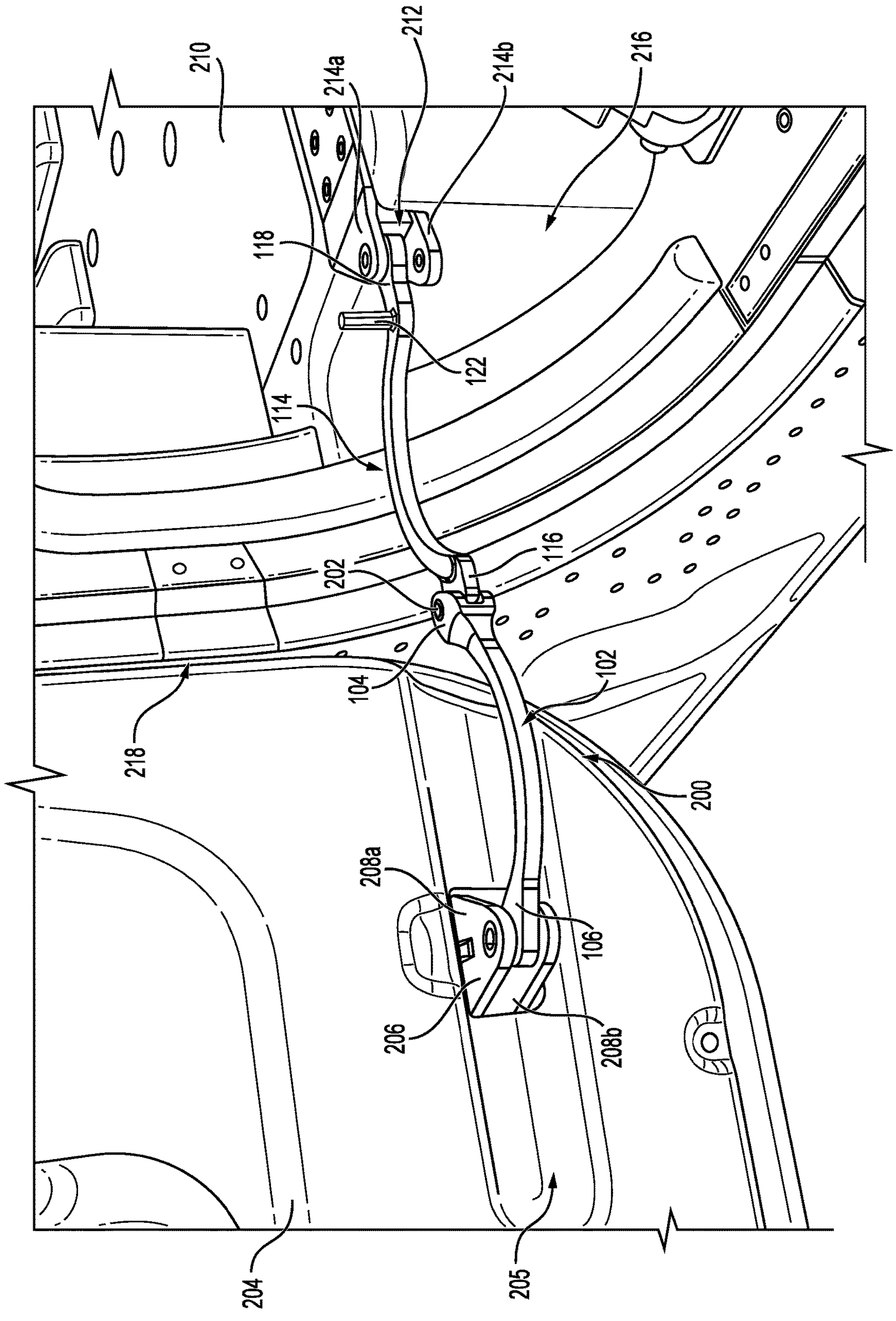
FIG. 2D illustrates the door stop mechanism in an open position for some embodiments.

FIG. 2D illustrates door stop mechanism 200 in an open position for some embodiments. When opened, outer link 102 may rotate about inner link 114, and inner link 114 may rotate about floor bracket connector 406 (see FIG. 4B). In some embodiments, inner link 114 is configured to rotate approximately 90° from the closed position to the open position. In some embodiments, outer link 102 is configured to rotate approximately 180° about link connector 202 from the closed position to the open position. In the open position, outer link 102 and inner link 114 may be substantially in-line with one another. Links 102, 114 may function as rigid links in operation; however, if a dynamic force is applied to door 204 (e.g., from a strong gust of wind), and door 204 is allowed to open in an uncontrolled manner, links 102, 114 are configured to elongate rather than instantly stopping the motion of door 204. This elongation of links 102, 114 slows the stopping of door 204 over time rather than substantially instantaneously, thereby lessening the force imparted into the surrounding structure. The deformation of links 102, 114 caused during this event may produce a permanent set in links 102, 114. By deforming links 102, 114, damage to the surrounding aircraft structure may be lessened. In some embodiments, links 102, 114 are configured to deform at a predetermined applied load to door 204 that is known to otherwise cause damage to the surrounding aircraft structure. The thickness and curvature of links 102, 114 may influence the point at which links 102, 114 permanently set. To increase the applied load at which links 102, 114 are permanently deformed, links 102, 114 may be sized larger and/or have the arc decreased. At the permanent set point of links 102, 114, the deformation due to the applied load may stay in the material after the applied load is removed. As such, links 102, 114 may hold their deformed shape, thus indicating that links 102, 114 should be replaced and the surrounding structure inspected.

In some embodiments, door stop mechanism 200 is configured to open without providing substantially any dampening to the opening of door 204 while door 204 is opened by about 100° from the closed position. In some embodiments, door 204 is rotatably connected to the aircraft body via door hinge mechanism 218. Door hinge mechanism 218 may comprise one or more hinges for rotatably connecting door 204 to the aircraft body. In some embodiments, door hinge mechanism 218 of door 204 is configured such that it swings open to the hold-open position when door 204 is unlatched and allowed to move freely.

Figure 3A:
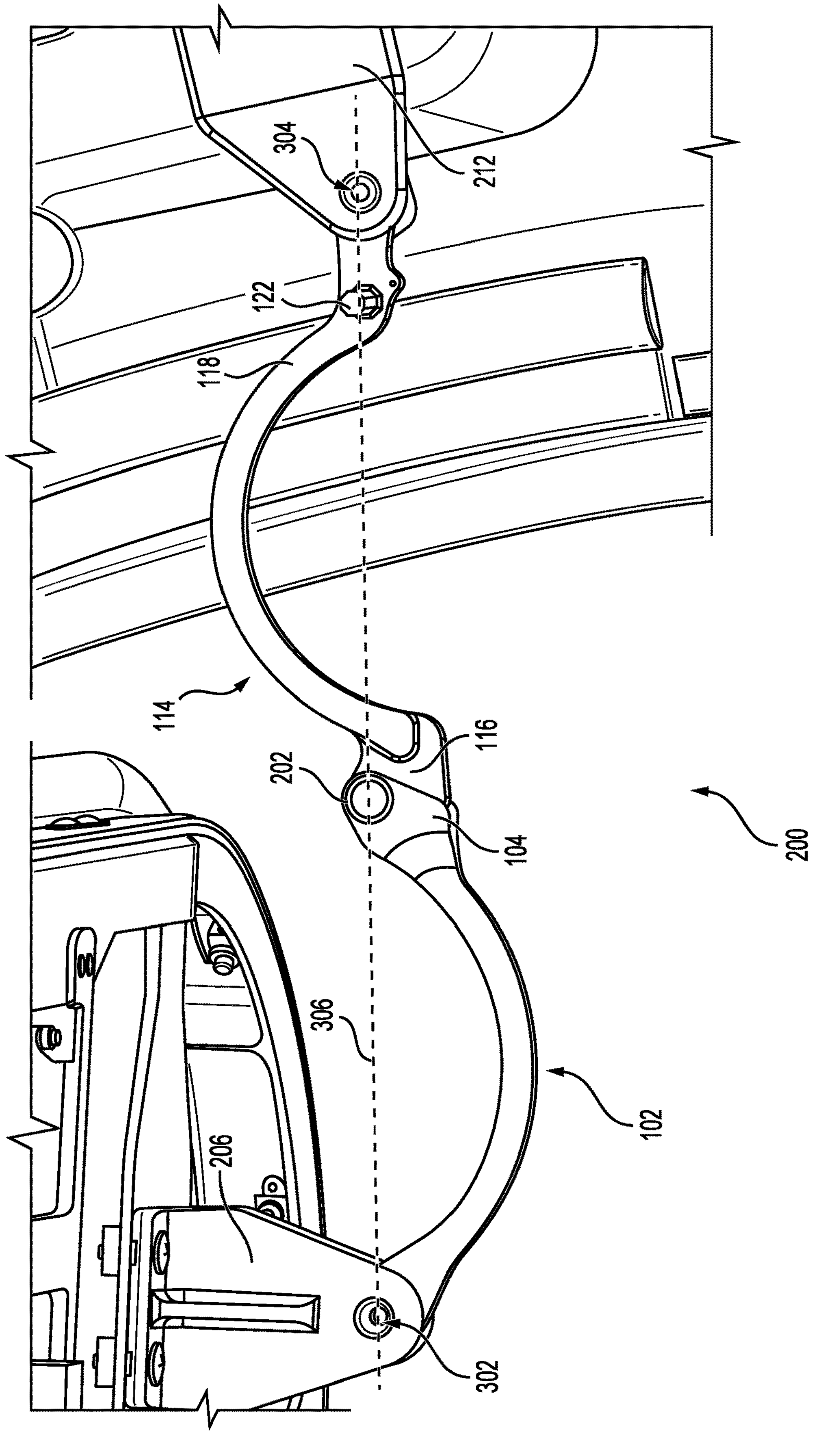
FIG. 3A illustrates a top view of the door stop mechanism in the open position for some embodiments.

FIG. 3A illustrates a top view of door stop mechanism 200 in a fully-open position for some embodiments. As shown, door stop mechanism 200 may be considered in the fully-open position when door bracket opening 302, link connector 202, and floor bracket connector 304 are substantially in-line with one another, as indicated by a centerline 306. The fully-open position of mechanism 200 also coincides with the door being fully open. In the fully-opened position, door bracket opening 302, link connector 202, and floor bracket connector 304 are substantially in-line with one another along centerline 306 forming an aligned arrangement. As discussed below, first ends 104, 116 may contact each other as links 102, 114 swing to a hold-open position as shown in FIG. 3B.

Figure 3B:
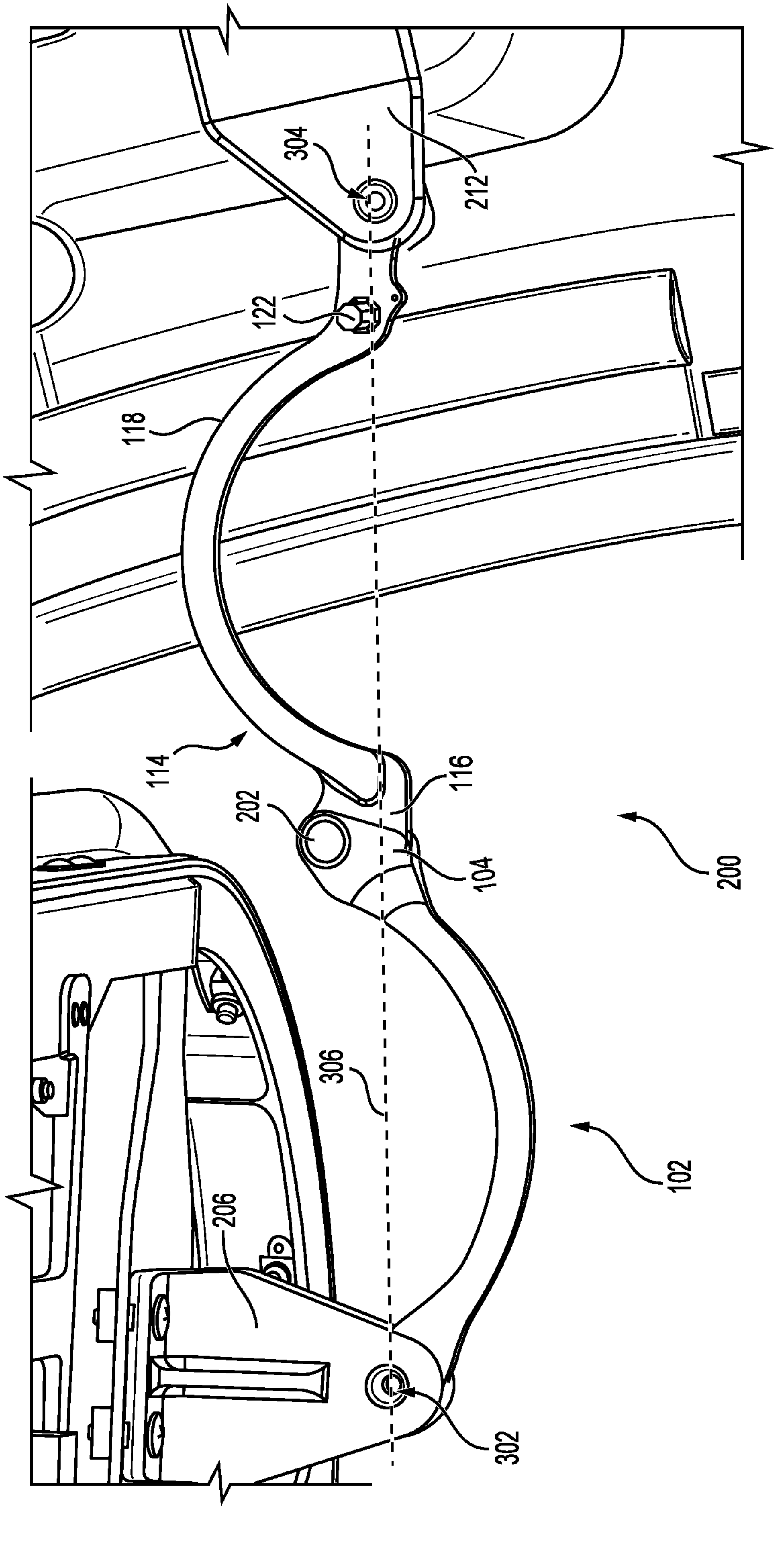
FIG. 3B illustrates a top view of the door stop mechanism in a hold-open position for some embodiments.

FIG. 3B illustrates door stop mechanism 200 in the hold-open position. Due to the pivot points of door stop mechanism 200 being in alignment with one another when in the fully-open position illustrated in FIG. 3A, when door 204 begins to close, door stop mechanism 200 is configured to continue rotating to the hold-open position shown in FIG. 3B. In the hold-opened position, link connector 202 has moved off centerline 306. As discussed below with respect to FIG. 4B, a biasing member 408 may be employed to help push door stop mechanism 200 off centerline 306 such that the mechanism 200 automatically moves from the fully-opened position to the hold-open position when the door is fully opened.

Figure 3C:
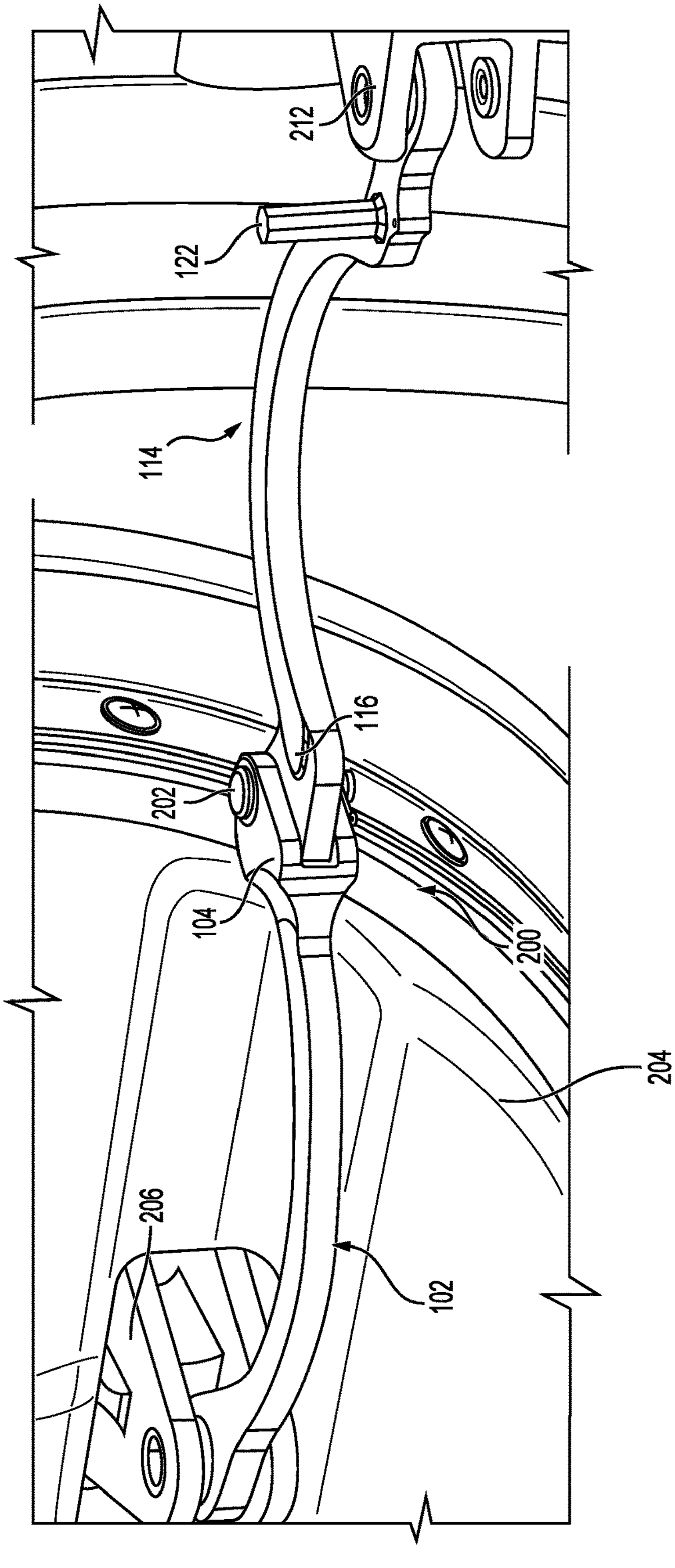
FIG. 3C illustrates a close-up view of the door stop mechanism in the hold-open position for some embodiments.

FIG. 3C provides a close-up view of door stop mechanism 200 in the hold-open position characterized by first end 116 abutting against an inner surface of first end 104, thereby preventing collapse of door stop mechanism 200. First end 104 and first end 116 are adjacent to the central pivot point about link connector 202. Consequently, a user may be prevented from closing door 204 when door stop mechanism 200 is in the illustrated hold-open position.

When it is desired to close door 204, a user (e.g., a crew member) may push or pull door stop mechanism 200 inwardly via release member 122 to move the pivot point at link connector 202 out of the hold-open position. Once below centerline 306, links 102, 114 may begin moving back to the semi-closed positions illustrated in FIG. 2C and then FIG. 2B, whereby door stop mechanism 200 moves outward and collapses to the closed position shown in FIG. 2A. The positioning of release member 122 on inner link 114 may allow for the crew member to reach release member 122 with their foot while seated. For example, the location of release member 122 substantially near second end 118 enables the crew member to reach their foot around an obstruction (e.g., an entry ladder in a cockpit) and still access release member 122. As such, the crew member may use their foot to move release member 122 and pull door 204 shut without having to reach down with a hand to disengage door stop mechanism 200 from the hold-open position. Alternatively, or additionally, the crew member may use their hand or a tool to pull release member 122 and shut door 204.

Figure 4A:
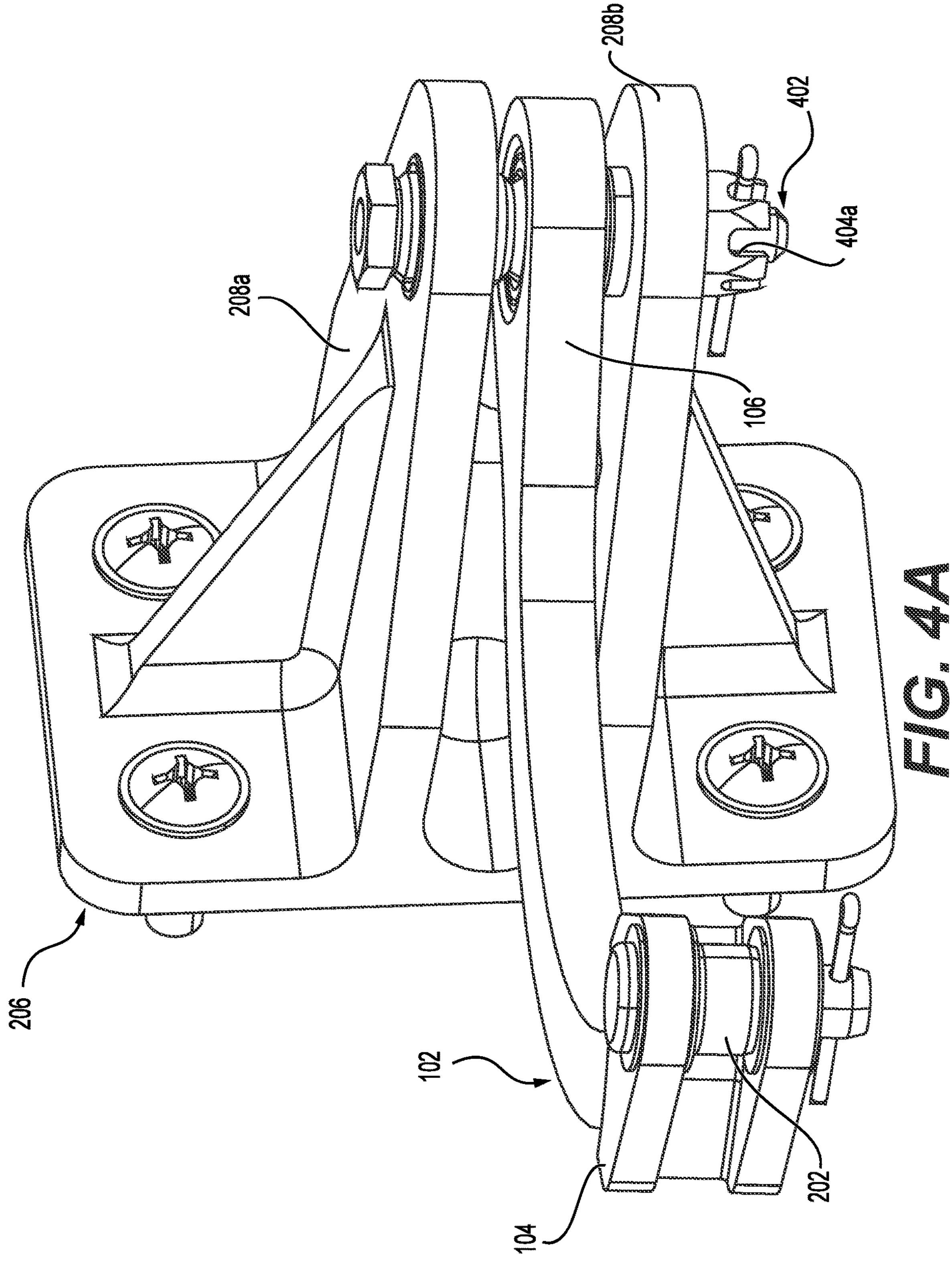
FIG. 4A illustrates a connection between the outer scissor link and a door bracket for some embodiments.

FIG. 4A illustrates outer link 102 connected to door bracket 206 for some embodiments. As described above, outer link 102 may be coupled to door 204 via door bracket 206. Second end 106 of outer link 102 may be inserted between upper arm 208*a* and lower arm 208*b* of door bracket 206, whereby outer link 102 is secured via door bracket connector 402. In some embodiments, door bracket connector 402 comprises screws, nuts, bolts, pins, rods, and the like. In some embodiments, door bracket connector 402 comprises a clevis fastener. In some embodiments, door bracket connector 402 comprises sleeves, spacers, springs, coils, washers, nuts, or any combination thereof along its body. Outer link 102 is configured to pivot about door bracket connector 402 for swinging between the open and closed positions described above. In some embodiments, door bracket connector 402 is secured with a first locknut 404*a*. In some embodiments, first locknut 404*a* comprises a castellated locknut.

FIG. 4A also illustrates link connector 202 for some embodiments. In some embodiments, link connector 202 is configured to secure outer link 102 to inner link 114 (inner link 114 has been omitted from FIG. 4A for clarity of illustration) as described above. Link connector 202 may comprise screws, nuts, bolts, pins, rods, and the like for fastening outer link 102 to inner link 114. In some embodiments, link connector 202 comprises a clevis fastener. In some embodiments, link connector 202 comprises sleeves, spacers, springs, coils, washers, or any combination thereof along its body. In some embodiments, link connector 202 is inserted into first opening 110*a* on upper arm 108*a*, into first opening 110*c* on first end 116 of inner link 114, and into first opening 110*b* on lower arm 108*b* to secure outer link 102 to inner link 114.

Figure 4B:
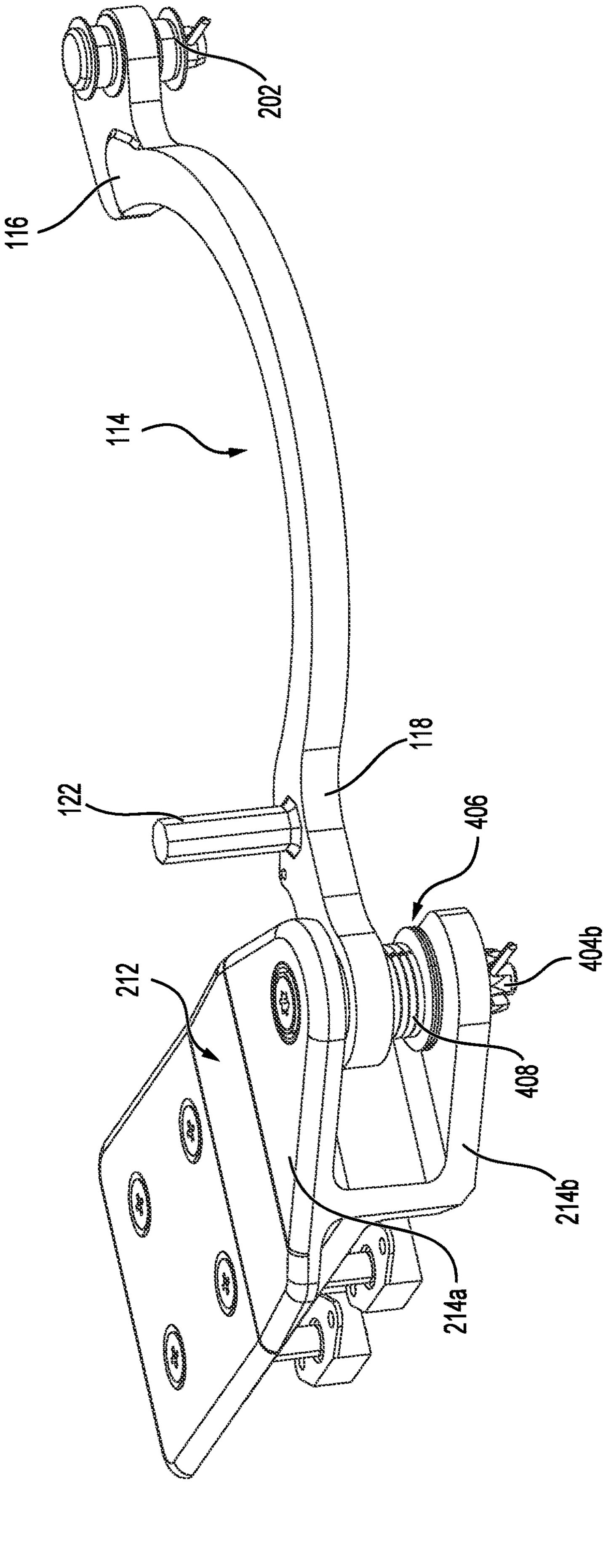
FIG. 4B illustrates a connection between the inner scissor link and a floor bracket for some embodiments.

FIG. 4B illustrates inner link 114 connected to floor bracket 212, thereby connecting inner link 114 to floor 210 (floor 210 omitted from FIG. 4B for clarity of illustration) for some embodiments. Second end 118 of inner link 114 may be inserted between upper arm 214*a* and lower arm 214*b* of floor bracket 212, whereby inner link 114 is secured via floor bracket connector 406. In some embodiments, floor bracket connector 406 comprises screws, nuts, bolts, pins, rods, and the like. In some embodiments, floor bracket connector 406 comprises a clevis fastener. In some embodiments, floor bracket connector 406 comprises sleeves, spacers, springs, coils, washers, nuts, or any combination thereof along its body.

In some embodiments, floor bracket connector 406 comprises biasing member 408 thereon. Biasing member 408 is a spring (e.g., a torsion spring) in embodiments. As described above, biasing member 408 may aid in pushing door stop mechanism 200 over centerline 306, thereby holding door 204 open. In some embodiments, when door 204 is rotated open, biasing member 408 is configured to push links 102, 114 over centerline 306 when door 204 reaches the end of travel. As such, door 204 may be moved into the hold-open position without substantially any user interaction. Once door 204 is unlatched, door 204 may automatically swing into the hold-open position. In some embodiments, biasing member 408 is configured to be strong enough to push door stop mechanism 200 over centerline 306, while providing minimal resistance when the user pulls release member 122 back over-center and door 204 rotates shut. In some embodiments, floor bracket connector 406 is secured with a second locknut 404*b*. In some embodiments, second locknut 404*b* comprises a castellated locknut.

While embodiments herein have been described with respect to using door stop mechanism 200 in an aircraft (e.g., the cockpit), door stop mechanism 200 may be utilized with various doors. Door stop mechanism 200 may be particularly useful in doors having substantially small openings. Further, door stop mechanism 200 may be useful when an external door stop mechanism is not desired.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A door stop mechanism for use with an aircraft door, the door stop mechanism comprising:
- a first link configured to be rotatably coupled to the aircraft door, the first link rotatable about a first pivot point;
- a second link configured to be rotatably coupled to a floor, the first link rotatable about a second pivot point;
- a third pivot point, wherein the first link is rotatably coupled to the second link via the third pivot point;
- wherein the first link and the second link are configured to rotate to a hold-open position in which ends of the first and second links abut one another to hold the aircraft door open; and
- wherein the first link nests within the second link to form a nested arrangement when the door is closed.

2. The door stop mechanism of claim 1, wherein the first link and the second link are configured to deform due to a predetermined force applied to the door, thereby preventing damage to a surrounding aircraft structure.

3. The door stop mechanism of claim 2, wherein a deformation of the first link and the second link due to the predetermined force comprises a permanent set in the first link and the second link indicating a need for replacement of the links and inspection of the surrounding aircraft structure.

4. The door stop mechanism of claim 1, wherein the second link comprises a curved shape configured for nesting within a curved shape of the first link such that the second link nests within the first link when in a closed position.

5. The door stop mechanism of claim 1, comprising a door bracket mounted to the aircraft door, wherein the door bracket is rotatably coupled to the first link.

6. The door stop mechanism of claim 1, comprising a floor bracket mounted to the floor, wherein the floor bracket is rotatably coupled to the second link.

7. The door stop mechanism of claim 1, comprising a release member that protrudes the second link, wherein the release member is configured for enabling a user to pull the second link to release the second links from abutting the first link thereby enabling the door to be closed.

8. The door stop mechanism of claim 4, wherein the door comprises a groove configured to receive a portion of the first link in the closed position.

9. The door stop mechanism of claim 6, comprising a spring operatively coupled to the second link, wherein the spring is configured to bias the second link to the hold-open position for automatically securing the door stop mechanism in the hold-open position when the door is fully open.

10. An aircraft door stop apparatus, comprising:

a first link pivotably coupled to a door about a first pivot point;

a second link pivotably coupled to a floor about a second pivot point; and a third pivot point, wherein the first link and the second link are jointly coupled together about the third pivot point, wherein the first link nests within the second link to form a nested arrangement when the door is closed, and wherein the first pivot point, the second pivot point, and the third pivot point are aligned with one another to form an aligned arrangement when the door is fully open.

11. The door stop apparatus of claim 10, wherein an end of the first link is configured to abut an end of the second link adjacent the third pivot point such that the third pivot point may be pushed into a hold-open arrangement for holding the door fully open.

12. The door stop apparatus of claim 11, comprising:

a spring coupled to the first link, wherein the spring is configured to bias the first link into the hold-open arrangement; and a release member operatively coupled to the first link, wherein displacement of the release member is configured to move the first link from the hold-open arrangement enabling closing of the door.

13. The door stop apparatus of claim 11, wherein the first link and the second link are configured to permanently elongate under a predetermined force applied to the door to prevent damage to a surrounding structure and to indicate a need for inspection of the surrounding structure.

* * * * *